United States Patent [19]

Young

[11] 3,740,954

[45] June 26, 1973

[54] VARIABLE SPEED HYDRAULIC DRIVE MECHANISM
[75] Inventor: Thomas A. Young, Roselle, Ill.
[73] Assignee: Motorola, Inc., Franklin Park, Ill.
[22] Filed: Mar. 20, 1972
[21] Appl. No.: 236,001

[52] U.S. Cl............ 60/489, 60/490, 60/491, 60/449, 418/212
[51] Int. Cl............ F16h 39/04, F16h 39/46
[58] Field of Search............ 60/489, 490, 491, 60/449, 445, 19; 418/212

[56] References Cited
UNITED STATES PATENTS
| | | | |
|---|---|---|---|
| 2,323,926 | 7/1943 | McGill | 60/489 |
| 2,371,922 | 3/1945 | Saito | 60/490 |
| 2,791,284 | 5/1957 | Jackson | 418/212 X |
| 3,241,320 | 3/1966 | Roberts | 60/449 |

Primary Examiner—Edgar W. Geoghegan
Attorney—Vincent J. Rauner and R. J. La Porte

[57] ABSTRACT

A variable speed hydraulic drive system includes an outer housing having a block member mounted for movement in a predetermined direction therein. The block member includes a pair of eccentric, communicating cylindrical chambers formed therein; the axes thereof being perpendicular to the movement of the block member. A positive displacement vane-type rotor is mounted in each chamber on an independently rotatable shaft. The rotor shafts are coaxial. Porting plates are provided at the inner ends of the chambers to permit passage of hydraulic fluid from one chamber to the other. One of the rotor shafts is driven by a prime mover. Rotation of the shaft causes a corresponding rotor to carry quantities of hydraulic fluid introduced into a respective chamber to the other chamber to drive the second rotor at a predetermined speed of rotation. The shaft of the second rotor is connected to an alternator or the like device. Movement of the block member alters the fluid displacement in both chambers simultaneously to change the ratio of speeds of rotation of the rotors.

8 Claims, 4 Drawing Figures

PATENTED JUN 26 1973

VARIABLE SPEED HYDRAULIC DRIVE MECHANISM

BACKGROUND

This invention relates generally to variable speed hydraulic drive mechanisms and more particularly to such drive mechanisms for transmitting power from a driving element rotating at a varying speed to a driven element which is to be rotated at desired speeds as required.

In automobiles or the like vehicle, it would be advantageous to drive an air conditioning unit or other accessory electrically directly from the alternator. This would require, however, that the output frequency of the alternator be maintained to accommodate the air conditioner under varying load conditions regardless of the speed of the automobile engine.

To accomplish the latter, it has been suggested to include in the alternator drive system a variable speed drive mechanism which is driven by the automobile engine and which drives the alternator at a desired speed of rotation in accordance with the requirements of the accessory, regardless of engine speed. The variable speed drive mechanisms available presently have not, however, been suitable for such use.

SUMMARY

Accordingly, it is a primary object of the present invention to provide a new and improved variable speed drive mechanism which can be used in the alternator drive system of a vehicle to maintain the speed of an alternator as desired regardless of the speed of the engine or prime mover.

It is another object of the invention to provide a variable speed drive mechanism of the above described type which is relatively compact, efficient in operation and relatively simple in design.

Briefly, a preferred embodiment of a variable speed drive mechanism according to the invention includes an outer housing in which there is provided a pair of coaxially mounted, independently rotatable shafts. A pulley connected to the free end of one of the shafts extending from the housing, is coupled by a drive belt to the engine of an automobile or other prime mover. The free end of the other rotatable shaft extending outwardly of the housing at the opposite end thereof is coupled directly to the shaft of an alternator.

On the inner end of each of the shafts within the housing, is a rotor of the type conventionally used in positive displacement vane-type pumps. Each rotor has a plurality of radially extending slots spaced circumferentially thereabout with movable vanes mounted therein. Also mounted within the housing is a block member having eccentric, cylindrical chambers or bores in communication with each other. Each of the rotors is mounted within one of the chambers. A pair of cylindrical, cup-shaped porting plates are fitted into the inner ends of the chambers in opposing relation for movement with the block member. Each end plate includes a slotted aperture to permit passage of hydraulic fluid from one rotor chamber to the other during operation. Outer end plates are provided at the ends of the housing and include "kidney-shaped" slots therein to permit fluid to enter and exit, respectively, from the housing.

In operation, fluid at low pressure is fed through the kidney-shaped opening into a first chamber in which the driving rotor is placed. The rotational movement of the shaft imparted to the driving rotor in the chamber carries pre-determined volumes of fluid between the vanes to the slot formed in the circular cup-shaped inner end plate of the chamber whereat it is fed through at high pressure and exits, still under high pressure, from the corresponding slot in the cup-shaped inner end plate of the other chamber housing the driven rotor. The force of the exiting fluid against the vanes of the rotor in the second chamber drives the last-mentioned rotor at a predetermined speed of rotation to turn the central shaft upon which the alternator is mounted. The hydraulic fluid finally exits through the kidney-shaped opening in the opposite outer end plate and is returned under low pressure for reuse.

A predetermined fluid displacement is provided in each chamber to drive the driven rotor at some predetermined speed with respect to the driving rotor. Movement of the block member in directions perpendicular to the axis of rotation of the rotor alters the fluid displacement in both chambers simultaneously to in turn change the ratio of speeds of rotation of the driving and driven rotors to compensate for speed changes in the pulley drive, thereby to maintain the driven rotor speed and thus the rotational speed of the alternator as desired.

A suitable hydraulic arrangement which utilizes the same hydraulic fluid used to drive the variable speed drive mechanism, may also be used to shift the position of the block member within the housing to alter the position thereof with respect to the rotors.

DETAILED DESCRIPTION

Figure 1:
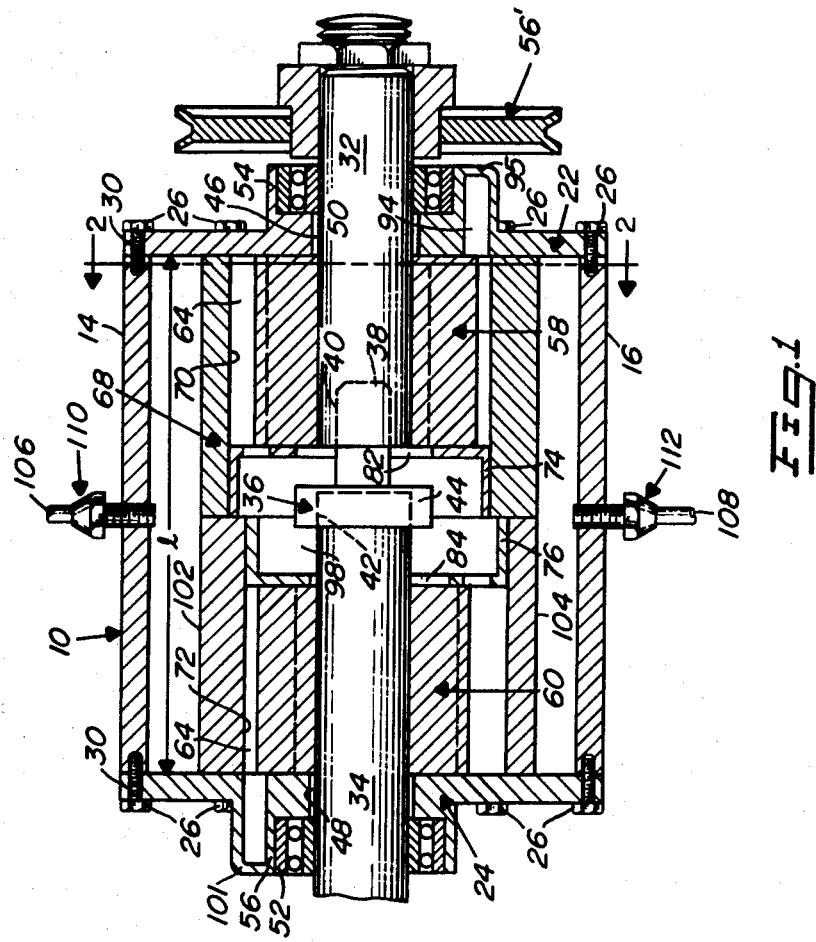
FIG. 1 is a side sectional view of a preferred embodiment of a variable speed drive mechanism according to the invention.

Referring now to the drawings in greater detail wherein like numerals have been used throughout the various views to designate similar components, a preferred embodiment of the hydraulic variable speed drive mechanism according to the invention includes an outer housing designated generally by the numeral 10. The housing includes a central box shaped portion 12 having four interconnected side walls 14, 16, 18, 20. A pair of end walls or plates 22, 24 are removably attached to the open ends of box portion 12 by means of fasteners such as bolts 26 received in apertures, such as 28 in the end walls and aligned threaded holes 30 in the box portion 12. When bolted together, the outer housing is sealed to prevent the escape of hydraulic control fluid.

Mounted within housing 10 is a pair of coaxial, independently rotatable shafts 32, 34, joined together within the housing by a bearing member 36, one end 38 of which is received in an aperture 40 (FIG. 1) in the inner end of shaft 32 for rotation therewith and which receives in an opening 42 (FIG. 1) in the opposite end thereof, the inner end of shaft 34. The bearing member rotates with shaft 32 and shaft 34 rotates independently with respect thereto. The free ends of the shafts extend outwardly from the housing 10 through apertures 46, 48 and end plates 22, 24, respectively. The shafts 32, 34 pass through roller bearings 50, 52 included in external extension portions 54, 56 of the end plates and providing stabilization and accurate rotation of the shafts.

A pulley 56' is connected to the free end of shaft 32 for coupling the shaft 32 by a drive belt (not shown) to a prime mover, such as, for example, the engine of an automobile. The free end of shaft 34 may be coupled directly to an alternator (not shown) or other electrical generating device or in the alternative, the shaft 34 can be an extension of the shaft of an alternator.

Figure 2:
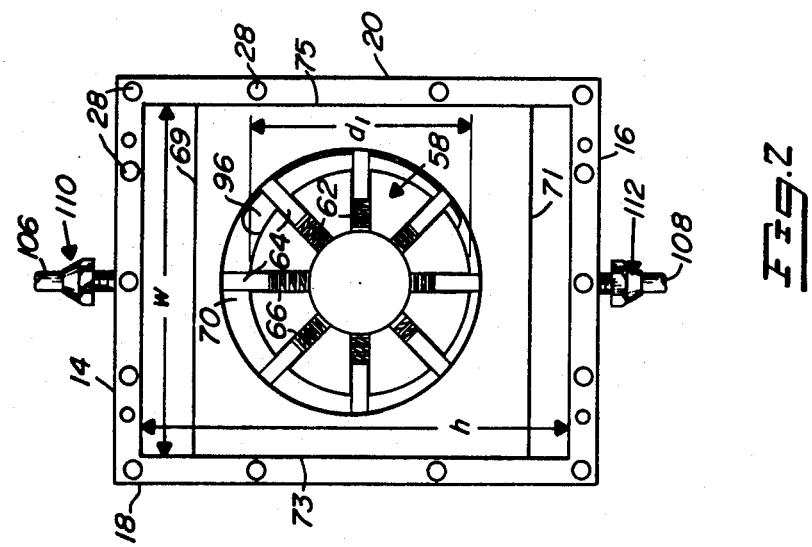
FIG. 2 is a sectional view of the variable speed drive mechanism of FIG. 1 taken along the line 2—2 thereof.
Figure 3:
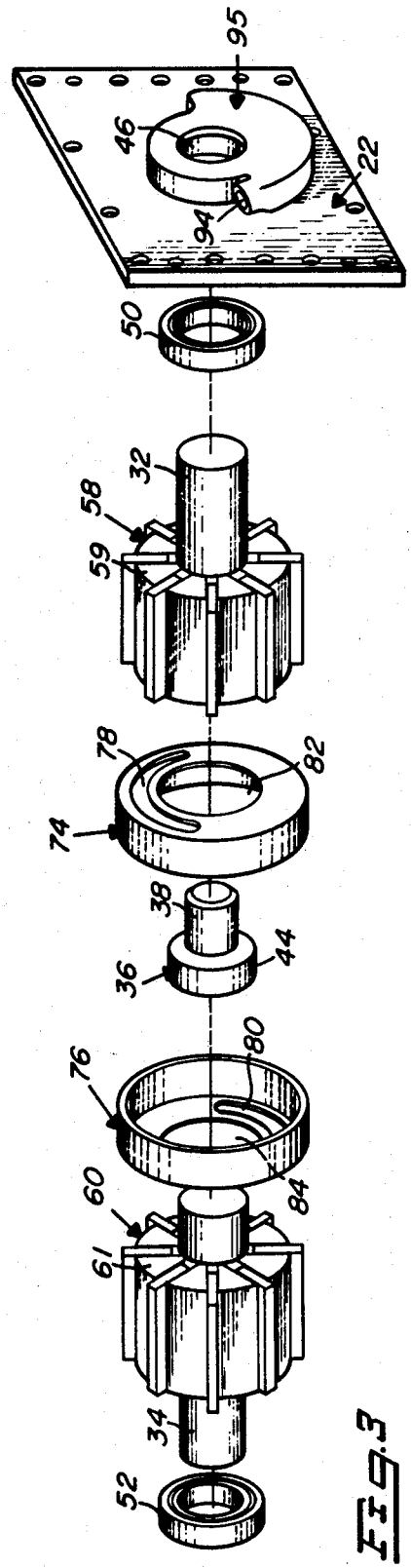
FIG. 3 is an exploded view of the internal rotor portions of the variable speed drive mechanism according to the inventon.

Mounted on the shafts within housing 10 are rotors 58, 60 of the type conventionally used in positive displacement vane-type pumps. Each rotor includes a central cylindrical portion 59, 61, respectively, of a predetermined diameter "$d_1$" (FIG. 2) having a plurality of radially extending slots, such as 62, formed therein and spaced circumferentially thereabout with radially movable vanes, such as 64 mounted therein. The vanes are biased radially outwardly by means of springs 66 or other suitable means.

Figure 4:
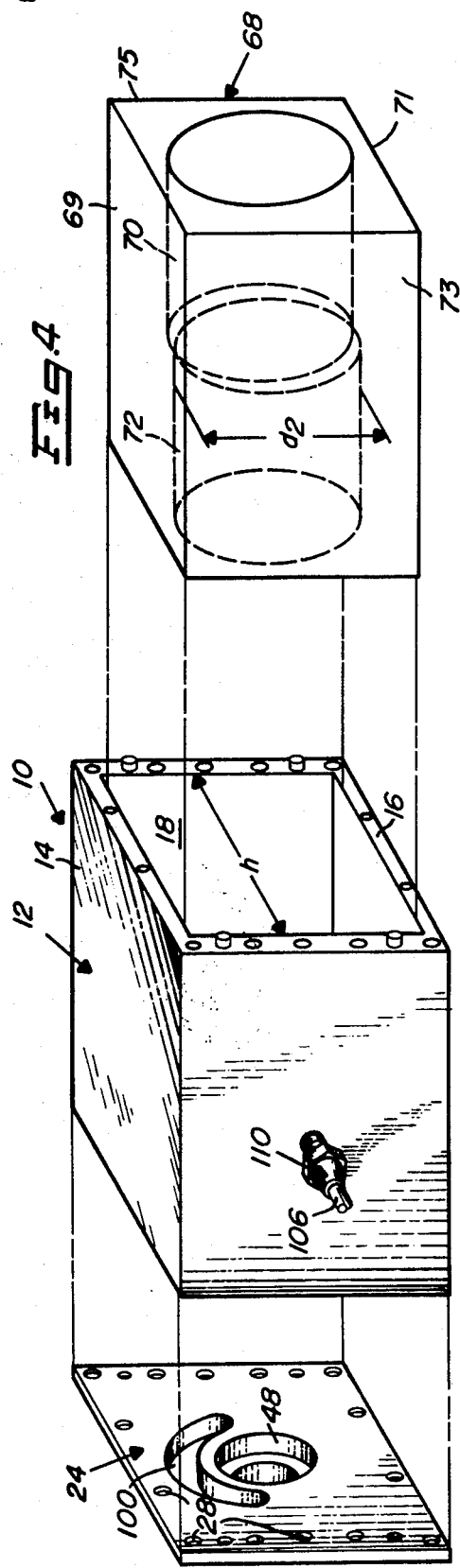
FIG. 4 is an exploded view of the outer housing and speed control block member of the variable speed drive mechanism of the invention.

Also mounted within housing 10 is a block member 68 having outer side walls 69, 71, 73, 75 and eccentric cylindrical chambers or bores 70, 72 formed therein from end walls 77, 79. The chambers are in communication with each other and the diameters $d_2$ thereof are greater than the diameters $d_1$ of the rotor portion 59, 61. The block member 68 is only slightly smaller in length and width than the inner dimensions "$l$" and "$w$" (FIGS. 1 and 2) of the housing 10, but is of a height substantially less than the internal height "$h$" (FIG. 4) thereof for movement therein. Each of the rotors 58, 60, is mounted for rotation within a chamber or bore in the block member. The vanes 64 thereof are biased outwardly so that the free ends thereof, which can be curved complementarily to the inner surface of the bore, slidably engage the inner surface of a respective chamber.

A pair of cylindrical, cup-shaped porting members 74, 76, are fitted into the inner ends of the chambers 70, 72, respectively, of the block member for movement therewith. Each inner end member includes a curved aperture 78, 80, extending a predetermined circumferential distance about said plate to permit the passage of hydraulic fluid from one rotor chamber to the othe during the operation of the drive mechanism. Central apertures 82, 84 provided in the cup-shaped members 74, 76, respectively, are of a diameter greater than that of rotatable shafts 32, 34 and receive the last-mentioned shafts therein. The leakage of hydraulic fluid from chambers 70, 72 is prevented by fabricating the rotors to close tolerances with respect to cup-shaped members 74, 76 and end plates 22, 24, respectively.

In operation, hydraulic fluid (not shown) is passed at a relatively low pressure into the open end 94 of a manifold 95 communicating with a kidney-shaped slot 96 (FIG. 2) formed in the end plate 22 of the housing. The rotation of driven rotor 58 provided by the prime mover coupled to pulley 56', drives predetermined volumes of the hydraulic fluid about chamber 70 and out through the curved opening 78 in the cup-shaped member 74 at the inner end of the chamber, into an intermediate chamber 98 (FIG. 1) formed between the opposing cup-shaped end members at a relatively high pressure. The force imparted by the rotation of rotor 58 forces the fluid from the intermediate chamber 98 through the curved opening 80 of the other cup-shaped end member into chamber 72 to drive rotor 60 at a predetermined rotational speed. The rotation of rotor 60 turns the central shaft 34 to drive the alternator or the like device coupled thereto substantially at the predetermined speed as well. Finally, the hydraulic fluid is forced outwardly of chamber 72 through the kidney-shaped opening 100 and an opening (not shown) in manifold 101 formed in end plate 24 at a relatively low pressure and is recirculated to opening 94 in manifold 95 for reuse.

It should be noted that the flow of hydraulic fluid in the variable speed drive mechanism of the invention during the actual driving operation is wholly internal of the mechanism. The only exterior flow of fluid is in the return path from the exit opening of manifold 101 of end plate 24 to the entrance opening 94 of manifold 95 in end plate 22.

The kidney-shaped openings in end plates 22, 24 are offset by 180° with respect to the curved openings in corresponding cup-shaped members 74, 76 so that proper pressure of the hydraulic fluid can be created prior to forcing the fluid through the openings in a respective cup-shaped member.

Predetermined fluid displacement is provided in each chamber 70, 72 to drive the driven rotor 60 at some predetermined speed of rotation with respect to the driving rotor 58. To change the rotational speed ratio of the driven rotor 60 with respect to the driving rotor 58, the fluid displacement in the chambers must be altered. To accomplish the latter, block member 68 is movable within housing 10 in directions perpendicular to the rotatable shafts 32, 34 and along the height dimension "$h$" of the outer housing 10 (see FIG. 1). Movement of the block member alters the positioning of the rotors simultaneously within respective eccentric chambers 70, 72 of the block member. Thus, the fluid displacement is changed accordingly, resulting in a change in the rotational speed ratio between the driving and driven shafts 32, 34, respectively. Thus, in the case wherein the shaft 32 is coupled to a variable speed prime mover, such as in the case of an automobile engine, and it is desired to obtain a substantially constant rotational speed of shaft 34 for driving an accessory, the movement of block member 68 in accordance with changes in the rotational speed of shaft 32 changes the speed ratio of the shafts to maintain the rotational speed of shaft 34 substantially constant.

The block member 68 may be moved in housing 10 in many ways, such as, for example, by mechanical gear arrangements, solenoids, etc. In the preferred embodiment, however, movement of the block member is accomplished through the use of hydraulic fluid pressure applied against one surface 102 or the other 104 thereof. Hydraulic fluid pumped into opening 106 of a screw-in type tube 110 inserted in the upper wall 14 of the housing 10 forces block member 68 to be moved downwardly as seen in FIG. 1 to a new position. Simultaneously with the pumping of fluid into the top opening, fluid is permitted to escape through the opening 108 of a lower pipe 112. When the block member is to be moved upwardly, fluid is pumped into the lower opening 108 of pipe 112 and is eliminated through the upper pipe 110. The use of hydraulic fluid for moving block member to vary the speed ratio of the rotor shafts 32, 34 with respect to each other, has the advantage that the hydraulic fluid used to drive the mechanism can be used therefor as well. Thus, the hydraulic system including the means for moving the block member can be a closed one if desired.

The use of the single block member for altering the speed ratio of the driving and driven shafts 32, 34, respectively, provides efficient and effective precise control to vary the speed ratio as the speed of the prime mover varies.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A variable speed fluid drive mechanism including in combination, an outer housing, a block member mounted within said housing, said block member having a pair of eccentric cylindrical chambers formed therein, said chambers being in communication with each other, said block member being movable within said housing in a predetermined direction perpendicular to the axes of said cylindrical chambers, first rotor means being mounted for rotation on a central shaft member within a first one of said chambers in said block member, second rotor means being mounted for rotation on a central shaft member within the second one of said chambers, first and second porting members provided at the inner ends of the chambers of said block member, respectively, for movement therewith, each said porting member having an opening therein to permit the passage of fluid therethrough, and first and second end plates mounted at each end of said housing, each said end plate having an opening therein to permit the passage of fluid therethrough, the shaft of said first rotor member being connectable to a prime mover for rotating said first rotor means within said first one of said chambers in said block member, thereby to carry predetermined volumes of fluid entering the opening in a respective end plate at low pressure, through the opening provided in a corresponding porting member at a relatively high pressure, said second rotor means being driven by fluid exiting at high pressure through said opening in said second porting member rotatably at a speed different than that of said first rotor means and said block member being movable in said predetermined direction to change the fluid volume displacement in each said chamber, thereby to alter the speed ratio of said first and second rotor means.

2. A variable speed hydraulic drive mechanism as claimed in claim 1 wherein said porting members are cup-shaped and are mounted in opposing relation with respect to each other to form a reservoir therebetween.

3. A variable speed hydraulic drive mechanism as claimed in claim 2 wherein the central shaft members of said first and second rotor means are coaxial with respect to each other, and wherein the openings in said porting members and in said end plates are positioned 180° from each other, respectively.

4. A variable speed hydraulic drive system as claimed in claim 3 wherein the openings in said porting members are curved, wherein the openings in said end plates are also curved and wherein the openings in the end plates are positioned 180° from the openings in corresponding porting members.

5. A variable speed hydraulic drive mechanism as claimed in claim 4 wherein said rotor means each comprise a vane-type rotor mechanism having a central cylindrical body mounted for rotation on said central shaft member and including a plurality of radially extending, circumferentially spaced slots included therein and a plurality of vane members, one being mounted in each of said slots, each said vane member being biased outwardly from said central body for engagement with the wall of the chamber in which a respective rotor means is mounted.

6. A variable speed hydraulic drive mechanism including in combination; an outer housing having four interconnected side walls forming an interior having a predetermined length, width and height, a block member being dimensioned similarly in length and width to the interior dimensions of said housing and predeterminedly smaller in height than the corresponding dimension of the interior of said housing, said block member being mounted within said housing and being movable therein between a predetermined pair of side walls of said housing, said block member including a pair of eccentric cylindrical chambers formed therein with the axis thereof extending perpendicular to the movement of said block member, said chambers being in communication with each other, a first vane-type rotor being mounted for rotation on a central shaft member within a first one of said chambers in said block member, a second vane-type rotor being mounted for rotation independently of said first rotor, on a central shaft member within said second chamber, said central shaft members being axially aligned with respect to each other, first and second porting plates mounted at the inner ends of the chamber, respectively, for movement with the block member, said porting plates being cup-shaped and mounted in opposing relation to form a passageway therebetween, each said porting plate having an opening therein to permit the passage of a fluid medium therethrough, and first and second end plates mounted at each end of said housing, each said end plate having a central aperture therein to permit the extension of a central shaft member therethrough, and each said plate having an opening therein to permit the passage of fluid therethrough between a corresponding chamber and exteriorly of said housing, the shaft of the first rotor being connectable to a prime mover for rotating the rotor within a corresponding chamber, thereby to carry predetermined quantities of fluid entering the opening in a respective end plate to the opening in a corresponding porting plate to cause movement of the fluid through said last-mentioned opening and into said passageway at a relatively high pressure, said second rotor being driven rotatably at a speed different than that of said first rotor by fluid exiting said passageway at a high pressure through said opening in said second porting plate, the relative speeds of rotation of said rotors being alterable by movement of said block member in said predetermined direction to change the fluid volume displacement in each of said chambers.

7. A variable speed hydraulic drive system as claimed in claim 6 wherein the openings in said porting plates are curved and extend a predetermined circumferential distance about said plates, wherein the opening in said end plates are curved and wherein said openings in the end plates are positioned 180° from the openings in corresponding porting plates.

8. A variable speed hydraulic drive mechanism as claimed in claim 7 further including hydraulic means for moving said block member between said predetermined side walls of said housing, said hydraulic moving means including fluid entrance and exit openings, whereby fluid is introduced and removed from the interior of said housing on opposite sides of said block member for repositioning the latter within said housing by force applied to the block member by said fluid.

* * * * *